(12) United States Patent
Nakamura

(10) Patent No.: US 9,108,561 B2
(45) Date of Patent: Aug. 18, 2015

(54) CHARGE CONTROL DEVICE

(71) Applicant: DENSO CORPORATION, Kariya, Aichi-pref. (JP)

(72) Inventor: Toshihiro Nakamura, Kariya (JP)

(73) Assignee: DENSO CORPORATION, Kariya (JP)

( * ) Notice: Subject to any disclaimer, the term of this patent is extended or adjusted under 35 U.S.C. 154(b) by 37 days.

(21) Appl. No.: 14/146,903

(22) Filed: Jan. 3, 2014

(65) Prior Publication Data

US 2014/0306816 A1    Oct. 16, 2014

(30) Foreign Application Priority Data

Apr. 10, 2013   (JP) .................................... 2013-82379

(51) Int. Cl.
*B60Q 1/00*         (2006.01)
*B60Q 9/00*         (2006.01)
*H02J 7/14*         (2006.01)

(52) U.S. Cl.
CPC ................. *B60Q 9/00* (2013.01); *H02J 7/1461* (2013.01)

(58) Field of Classification Search
CPC ...... Y02T 90/14; Y02T 10/7005; B60Q 9/00; B60Q 9/001; H02J 7/1461
USPC ............. 340/457, 455, 468; 701/22, 99, 32.3; 180/65.21, 65.27; 320/109
See application file for complete search history.

(56) References Cited

U.S. PATENT DOCUMENTS

| | | | |
|---|---|---|---|
| 2007/0200431 A1 | 8/2007 | Yamaguchi | |
| 2009/0021364 A1* | 1/2009 | Frey et al. | 340/468 |
| 2009/0079225 A1* | 3/2009 | Katou | 296/97.22 |
| 2009/0082916 A1* | 3/2009 | Tanaka | 701/22 |
| 2010/0133024 A1* | 6/2010 | Miwa et al. | 180/65.21 |
| 2010/0204859 A1 | 8/2010 | Kamaga | |
| 2010/0204865 A1* | 8/2010 | Nakamura | 701/22 |
| 2010/0271192 A1* | 10/2010 | Mituta | 340/455 |
| 2010/0320018 A1* | 12/2010 | Gwozdek et al. | 180/65.27 |
| 2010/0320964 A1* | 12/2010 | Lathrop et al. | 320/109 |
| 2011/0022256 A1* | 1/2011 | Asada et al. | 701/22 |
| 2011/0178663 A1* | 7/2011 | Crombez | 701/22 |
| 2012/0007554 A1* | 1/2012 | Kanamori et al. | 320/109 |
| 2012/0065839 A1* | 3/2012 | Makino et al. | 701/36 |

(Continued)

FOREIGN PATENT DOCUMENTS

| | | |
|---|---|---|
| JP | 2003-219503 A | 7/2003 |
| JP | 2006-256481 A | 9/2006 |

(Continued)

OTHER PUBLICATIONS

Office Action issued Mar. 10, 2015 in corresponding JP Application No. 2013-82379 (with English translation).

*Primary Examiner* — Hoi Lau

(57) ABSTRACT

A vehicle is equipped with a charge plug. The vehicle includes a vehicular battery charged through the charge plug. A charge control device for the vehicle includes a vehicle information acquisition unit, an exit determination unit, and an alarming operation unit. The vehicle information acquisition unit acquires vehicle information, which represents a state of the vehicle. The exit determination unit determines, according to the vehicle information, whether an occupant of the vehicle has an exit intention to exit from the vehicle. The alarming operation unit implements an alarming operation to restrict the occupant from forgetting to mount the charge plug when the exit determination unit determines that the occupant has the exit intention.

9 Claims, 2 Drawing Sheets

(56) References Cited

U.S. PATENT DOCUMENTS

| | | | |
|---|---|---|---|
| 2012/0206099 A1* | 8/2012 | Ichikawa et al. | 320/109 |
| 2012/0319648 A1* | 12/2012 | Ohtomo | 320/109 |
| 2013/0110340 A1* | 5/2013 | Park et al. | 701/22 |
| 2013/0158744 A1* | 6/2013 | Inoue et al. | 701/2 |
| 2013/0173102 A1* | 7/2013 | Aldighieri et al. | 701/22 |
| 2013/0218402 A1* | 8/2013 | Hoshihara et al. | 701/32.3 |
| 2013/0255333 A1* | 10/2013 | Kurumizawa et al. | 70/237 |
| 2013/0271076 A1* | 10/2013 | Gregg et al. | 320/109 |
| 2014/0152255 A1* | 6/2014 | Lovett et al. | 320/109 |
| 2014/0306816 A1* | 10/2014 | Nakamura | 340/457 |
| 2015/0066257 A1* | 3/2015 | Ochocinski et al. | 701/22 |

FOREIGN PATENT DOCUMENTS

| | | |
|---|---|---|
| JP | 2008-289220 A | 11/2008 |
| JP | 2009-060728 A | 3/2009 |
| JP | 2012-170181 A | 9/2012 |
| JP | 2013-055806 A | 3/2013 |

* cited by examiner

CHARGE CONTROL DEVICE

CROSS REFERENCE TO RELATED APPLICATION

This application is based on reference Japanese Patent Application No. 2013-82379 filed on Apr. 10, 2013, the disclosure of which is incorporated herein by reference.

TECHNICAL FIELD

The present disclosure relates to a charge control device for a vehicle, which is mounted with a charge plug and equipped with a vehicular battery charged through the charge plug.

BACKGROUND

Patent Document 1 discloses an example of a conventional charge control device. The charge control device notifies a user (occupant of vehicle) of that the user forgets to insert a charge plug when the user shows an intention to charge the vehicle and when the charge plug is not inserted to the vehicle.

(Patent Document 1)
Publication of Unexamined Japanese Patent Application No. 2012-170181

It is noted that, the charge control device of Patent Document 1 may be configured to notify a user of that the user forgets to insert the charge plug when the user shows an intention to charge the vehicle. Nevertheless, the charge control device is not configured to notify a user of that the user forgets to insert the charge plug when the user does not show an intention to charge the vehicle. Therefore, the charge control device of Patent Document 1 may cause a user to forget to insert the charge plug when the user does not show an intention to charge the vehicle, even though the user should charge the vehicle.

SUMMARY

It is an object of the disclosure to produce a charge control device configured to restrict a user from forgetting to mount a charge plug.

According to an aspect of the present disclosure, a charge control device is for a vehicle, and the vehicle is configured to be equipped with a charge plug. The vehicle is equipped with a vehicular battery configured to be charged through the charge plug. The charge control device comprises a vehicle information acquisition unit configured to acquire vehicle information, which represents a state of the vehicle. The charge control device further comprises an exit determination unit configured to determine, according to the vehicle information, whether an occupant of the vehicle has an exit intention to exit from the vehicle. The charge control device further comprises an alarming operation unit configured to implement an alarming operation to restrict the occupant from forgetting to mount the charge plug when the exit determination unit determines that the occupant has the exit intention.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION

Embodiment

As follows, an embodiment of the present disclosure will be described with reference to drawings. An exemplified vehicle herein has a charge plug and a vehicular battery, which is charged through the charge plug. The vehicle is equipped with a charge control device 10 according to the present embodiment. That is, the exemplified vehicle equipped with the charge control device 10 is, for example, a plug-in hybrid vehicle or an electric vehicle. The vehicle is configured to charge the vehicular battery through the charge plug by utilizing electricity provided from a public charge facility and/or a home-use electric socket.

The vehicle has a mounting port. The charge plug is mountable to the mounting port and is detachable from the mounting port. The vehicle has a charge lid, which is a cover of the mounting port. The charge lid is configured to open and close. When the charge lid is in a closing state, equipment of the charge plug to the mounting port is prohibited, and the vehicle cannot be charged though the charge plug. Alternatively, when the charge lid is in an opening state, equipment of the charge plug to the mounting port is allowed, and the vehicle can be charged though the charge plug. The mounting port of the charge plug may function as a charge port, to which the charge plug is mountable and from which the charge plug is detachable. The mounting port of the charge plug may also function as an insertion port, in which the charge plug can be inserted and from which the charge plug can be pulled.

Figure 1:
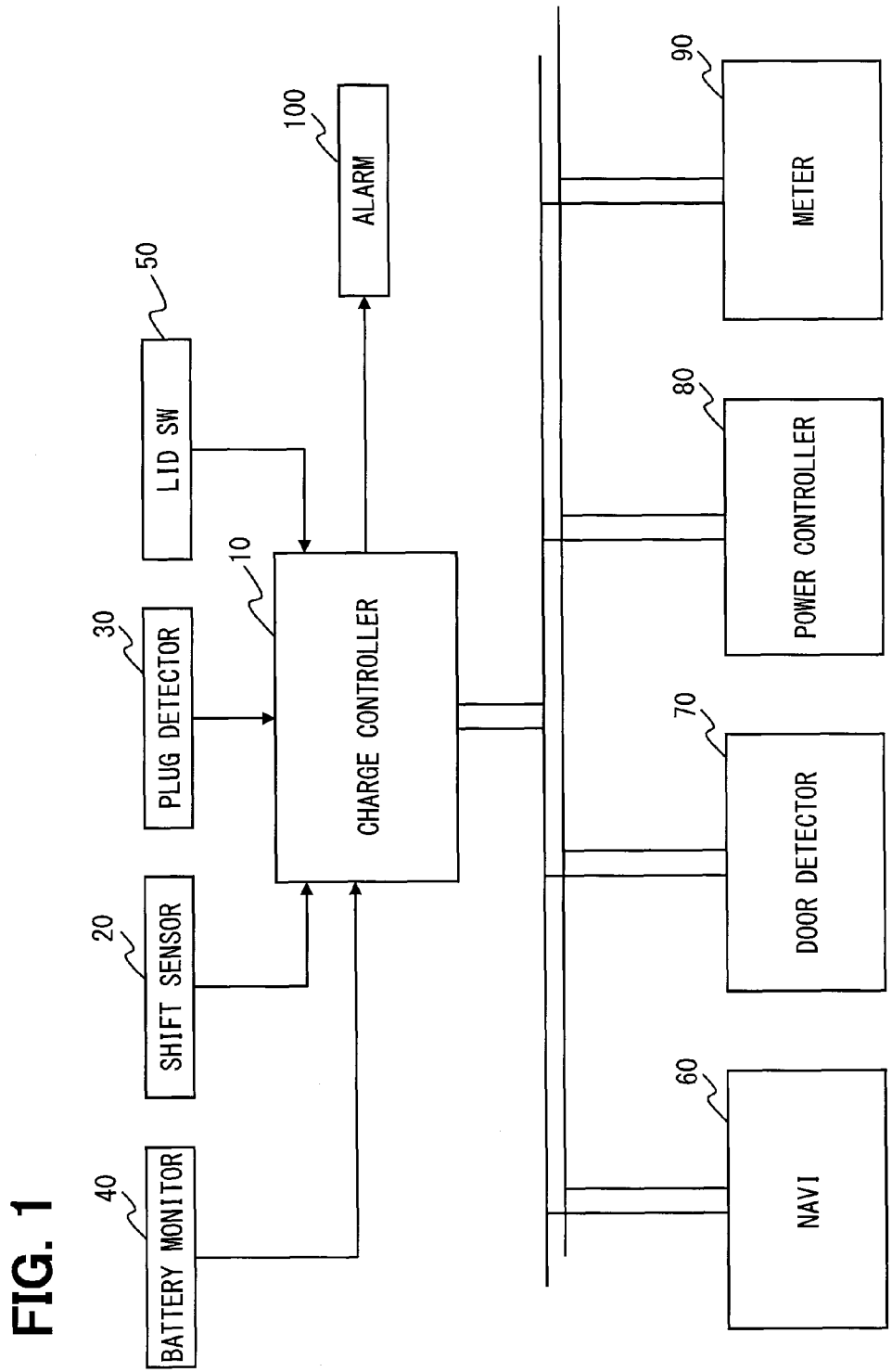
FIG. 1 is a block diagram showing an overview of a vehicular control device according to an embodiment.

As shown in FIG. 1, the charge control device 10 is coupled with various vehicular devices 20 to 100, such that the charge control device 10 is communicable with the various vehicular devices. The charge control device 10 and the various vehicular devices 20 to 100 form a vehicular control system. In the present embodiment, the charge control device 10, a navigation device 60, a door detection device 70, a meter device 90, and an output power control device 80 are coupled with each other through a vehicular network, such as a controller area network (CAN). Further, in the present embodiment, a shift sensor 20, a plug detection unit 30, a battery monitor device 40, a lid switch 50, and an alarm device 100 are coupled directly with the charge control device 10, without passing through the vehicular network. It is noted that, the present disclosure is not limited to this example.

The charge control device 10 is, for example, a generally known computer including hardware devices, such as a CPU, a ROM, a RAM, and a bus line, which connects these devices. The charge control device 10 executes various processings by causing the CPU to read an execution program and various data from the ROM, to acquire data from each of the vehicular devices 20 to 90, and to execute predetermined arithmetic processings by utilizing the RAM as a temporary storage area. More specifically, the charge control device 10 executes an insertion oversight avoidance processing, which will be describe later. In other words, the charge control device 10 has a function to avoid oversight of insertion of the charge plug. The CPU represents a central processing unit. The ROM represents a read only memory. The RAM represents a random access memory.

The charge control device 10 is configured to acquire various kinds of vehicle information, each representing the state of the vehicle, from the vehicular devices 20 to 90. Specifically, the charge control device 10 is configured to acquire, as the vehicle information, shift information, mounting information, residual quantity information, lid information, charge information, opening-and-closing information, lock information, smart key information, power source information, and distance information.

The shift sensor 20 detects the state of the shift range of the vehicle and sends the shift information, which represents the state of the shift range. The shift information is configured, for example, to enable determination of the transition state of the shift range. More specifically, the shift information is configured, for example, to enable determination of transition of the shift range from a non-parking range to a parking range. In the present configuration, the charge control device 10 functions as a shift information acquisition unit to acquire the shift information from the shift sensor 20.

The plug detection unit 30 detects whether the charge plug is mounted to the mounting port. The plug detection unit 30 further sends mounting information, which represents whether the charge plug is mounted to the mounting port. In other words, the plug detection unit 30 sends the mounting information, which represents the mounting state of the charge plug relative to the mounting port. In the present configuration, the charge control device 10 functions as a mounting information acquisition unit to acquire the mounting information from the plug detection unit 30.

The battery monitor device 40 detects the residual quantity of the vehicular battery. The battery monitor device 40 further sends the residual quantity information, which represents the residual quantity. In other words, the battery monitor device 40 sends, as information representing the state of the vehicular battery, the residual quantity information, which represents the residual quantity. In the present configuration, the charge control device 10 functions as a residual quantity information acquisition unit to acquire the residual quantity information from the battery monitor device 40. The present embodiment may employ a configuration excluding the acquisition of the residual quantity information. That is, the battery monitor device 40 may be excluded from the vehicular control system.

The lid switch 50 detects the opening-and-closing state of the charge lid. The lid switch 50 further sends the lid information, which represents the opening-and-closing state. The charge control device 10 functions as a lid information acquisition unit to acquire the lid information from the lid switch 50.

The navigation device 60 is configured to retrieve position data, which represents the current position of the vehicle. The navigation device 60 is further configured to acquire map data from a map database. The map database stores, as the map data, generally known data such as road data and facility data. The facility data include, for example, data, which represent a home of an occupant, and/or data, which represent a charge facility to charge the vehicular battery.

The navigation device 60 determines, according to the acquired position data and the acquired map data, whether the vehicle is at a position (place) in which the vehicle (vehicular battery) can be charged. The navigation device 60 further sends charge information, which represents whether the vehicle is at the position where the vehicle can be charged. In the present configuration, the charge control device 10 functions as a charge information acquisition unit to acquire the charge information from the navigation device 60. In other words, the charge control device 10 is configured to acquire the charge information, which represents whether the vehicle exists at the position where the vehicle can be charged. The present embodiment may employ a configuration excluding the acquisition of the charge information. That is, the navigation device 60 may be excluded from the vehicular control system.

In the present embodiment, the navigation device 60 makes the determination whether the vehicle is at the position (place) where the vehicle can be charged. It is noted that, the charge control device 10 may make the present determination. In this case, the charge control device 10 acquires the position data and the map data from the navigation device 60. In addition, the charge control device 10 determines, according to the acquired position data and the acquired map data, whether the vehicle is at the position where the vehicle can be charged thereby to acquire the charge information.

The door detection device 70 detects the opening-and-closing state of the door of the vehicle and detects a locked-and-unlocked state of a lock mechanism of the door. The door detection device 70 further sends the opening-and-closing information, which represents the opening-and-closing state, and sends the lock information, which represents the locked-and-unlocked state. In the present configuration, the charge control device 10 functions as an opening-and-closing information acquisition unit to acquire the opening-and-closing information from the door detection device 70. In the present configuration, the charge control device 10 functions as a lock information acquisition unit to acquire the lock information from the door detection device 70.

The vehicle may include a communication device to implement mutual communications with a portable device, such as a vehicular key, thereby to cause a door control device to control locking and unlocking of the lock mechanism. The door control device is configured to send a request signal in a predetermined region (wireless-communication area) around the vehicle. When an authentic vehicular key of an authentic user of the vehicle enters a wireless-communications area, the door control device controls locking and unlocking of the door. Further detailed description is omitted. The wireless-communications area is set in a range, for example, about 0.7 meters to 1.0 meters.

In this case, the door detection device 70 detects a mutual communication state between the vehicular key and the door control device. The door detection device 70 further sends smart key information, which represents the mutual communication state. In other words, the door detection device 70 sends the smart key information, which represents whether the door control device is communicable with the vehicular key. The smart key information may be configured to enable determination whether the mutual communications between the communication device and the vehicular key have terminated. In the present configuration, the charge control device 10 functions as a smart key information acquisition unit to acquire the smart key information from the door detection device 70. The present embodiment may employ a configuration excluding the acquisition of the opening-and-closing information, the lock information, and the smart key information. That is, the door detection device 70 may be excluded from the vehicular control system.

The output power control device 80 detects the operation state of a power source, such as a motor and/or an engine of the vehicle. The output power control device 80 further sends the power source information, which represents the operation state of the power source. In the present configuration, the charge control device 10 functions as a power source information acquisition unit to acquire the power source information from the output power control device 80. The present embodiment may employ a configuration excluding the acquisition of the power source information. That is, the output power control device 80 may be excluded from the vehicular control system.

The meter device 90 has the distance information, which represents a traveling distance of the vehicle, and sends the distance information. More specifically, the meter device 90 sends the distance information, which represents the traveling distance of the vehicle in a period after an ignition device of the vehicle is activated before the ignition switch is de-activated subsequently. In other words, the meter device 90 sends the distance information, which represents the state how distant the vehicle has traveled. In the present configuration, the charge control device 10 functions as a distance information acquisition unit to acquire the traveling distance information from the meter device 90. The present embodiment may employ a configuration excluding the acquisition of the traveling distance information. That is, the meter device 90 may be excluded from the vehicular control system.

The alarm device 100 implements an alarming operation for avoiding a user from overseeing (forgetting) mounting of the charge plug. This alarm device 100 causes, in response to an instruction from the charge control device 10, at least one of a sound and a message (display and/or indication) in a passenger compartment of the vehicle. In other words, the alarm device 100 is an output device to cause an alarming sound and/or an alarming message for avoiding overseeing (forgetting) of the mounting of the charge plug. The alarm device 100 may have a configuration to emit at least one of a sound and a message to the outside of the vehicle. The vehicle may be configured to implement various kinds of alarming operations, such as to emit a warning sound to warn forgetting of removal of a vehicular key and/or to prompt locking of a door. Therefore, in a configuration to cause the alarm device 100 to implement an alarming operation, which is to avoid a user from forgetting mounting of the charge plug, it may be desirable to enable the user to recognize the alarming operation from another alarming operation. In the following description, the alarming operation, which is for avoiding a user from forgetting mounting of the charge plug, may be simply be noted as an alarming operation.

Figure 2:
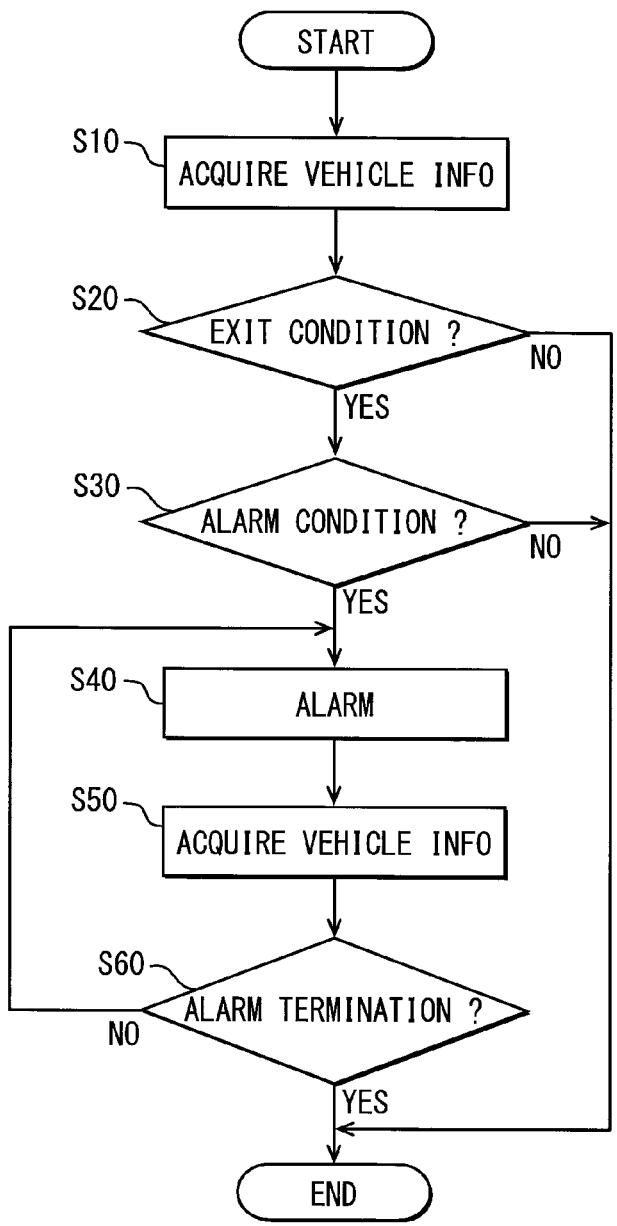
FIG. 2 is a flow chart showing an operation of the charge control device according to the embodiment.

As follows, the insertion oversight avoidance processing of the charge control device 10 will be described with reference to FIG. 2. The charge control device 10 executes a processing shown by a flow chart of FIG. 2 at a predetermined time interval.

At step S10, the charge control device 10 functions as a vehicle information acquisition unit to execute a vehicle information acquisition processing. The charge control device 10 acquires, as the vehicle information, the lid information and the shift information. More specifically, the charge control device 10 acquires the shift information in order to determine whether an occupant has an intention (exit intention) to exit the vehicle. In addition, the charge control device 10 acquires the lid information in order to determine whether an alarm output condition is satisfied.

At step S20, the charge control device 10 functions as an exit determination unit to determine whether an exit condition is satisfied. That is, the charge control device 10 determines whether an occupant has an intention to exit from the vehicle. The charge control device 10 determines whether an occupant has an intention to exit from the vehicle according to the shift information, which is acquired at step S10. In this way, in the present embodiment, the shift information is used as information for determining the exit intention of an occupant.

In a case where the charge control device 10 determines, according to the shift information, that the shift range is not changed from the non-parking range to a parking range, the charge control device 10 determines that an occupant does not have the exit intention. Thus, the charge control device 10 terminates the processing of FIG. 2.

Alternatively, in a condition where the charge control device 10 determines, according to the shift information, that the shift range is changed from the non-parking range to the parking range, the charge control device 10 determines that the occupant has the exit intention. In this case, the processing proceeds to step S30. That is, the charge control device 10 determines that the occupant has the exit intention, when the acquired shift information represents that the shift range is changed from the non-parking range to the parking range. In other words, the charge control device 10 determines whether an occupant exits from the vehicle according to the determination whether the shift range is changed from the non-parking range to the parking range or not.

An occupant certainly changes the shift range to the parking range by using a shift manipulation device such as a shift lever, when exiting from a vehicle. That is, an occupant changes the shift range from the non-parking range, such as the drive range and/or the reverse range, other than the parking range to the parking range, when exiting from the vehicle. Therefore, the charge control device 10 is enabled to determine that an occupant exits from a vehicle, when the shift range of the vehicle is changed to the parking range. It is noted that, the charge control device 10 may be configured to determine that an occupant has the exit intention, when the shift range is changed from the non-parking range to the parking range and when an ignition switch of the vehicle is turned OFF (de-activated).

At step S30, the charge control device 10 functions as a condition satisfaction determination unit to determine whether an alarm output condition is satisfied. This determination is made to determine whether it is necessary to implement the alarming operation or not. In other words, the present determination is made to limit a scene (state, condition) when the alarming operation is implemented only to an occasion when the alarming operation is needed.

The charge control device 10 determines whether the alarm output condition is satisfied according to the lid information, which is acquired at step S10. The charge control device 10 determines that the alarm output condition is satisfied, when the lid information represents a closing state, in which an electricity supply lid (charge lid) is closed. In this case, the processing proceeds to step S40. Alternatively, the charge control device 10 determines that the alarm output condition is not satisfied, when the lid information represents an opening state, in which the electricity supply lid is open. In this case, the processing of FIG. 2 is terminated.

At step S40, the charge control device 10 functions as an alarming operation unit to execute an alarm output processing at step S40. The charge control device 10 instructs the alarm device 100 to output an alarm. That is, the charge control device 10 implements the alarming operation by utilizing the alarm device 100. In other words, the charge control device 10 starts the alarming operation by utilizing the alarm device 100. In this way, the charge control device 10 implements the alarming operation on determination that an occupant has the exit intention and further on determination that the alarm output condition is satisfied.

It is noted that, the charge control device 10 may be configured to execute the process at step S40, without implementation of the determination at step S30. That is, the charge control device 10 may implement the alarming operation primarily on determination that an occupant has the exit intention.

It is further noted that, the present embodiment employs the configuration to implement the alarming operation on determination that the alarm output condition is satisfied, in addition to determination that an occupant has the exit intention. Therefore, as described above, the present embodiment employs the configuration to implement the alarming operation on determination that the electricity supply lid is in the closing state. In this case, the present state is determined to be a needed occasion, in which the alarming operation is needed. The present configuration enables to implement the alarming operation selectively in the needed occasion.

When the electricity supply lid is in the opening state, it is deemed that the occupant has an intention to charge the vehicular battery. Therefore, in this case, the alarming operation is not needed. To the contrary, when the electricity supply lid is in the closing state, an occupant may be deemed not to have an intention to charge the vehicular battery. In this case, the occupant may forget that the vehicular battery needs to be charged, even though the vehicular battery needs to be charged actually. Thus, in this case, the occupant may not have an intention to charge the vehicular battery. Therefore, when the electricity supply lid is in the closing state, it is conceivable that the alarming operation is needed. Therefore, the charge control device 10 is enabled to implement the alarming operation selectively when an occupant does not intend to charge the vehicular battery. In other words, the charge control device 10 is enabled to implement the alarming operation selectively in the needed occasion.

At step S50, the charge control device 10 functions as a vehicle information acquisition unit again to execute the vehicle information acquisition processing. The charge control device 10 acquires the mounting information as the vehicle information. More specifically, the charge control device 10 acquires the mounting information in order to determine whether a termination condition to terminate the alarming operation is satisfied.

At step S60, the charge control device 10 functions as a termination determination unit to determine whether an alarm termination condition is satisfied. The alarming operation implemented at step S40 is to avoid the occupant from forgetting mounting of the charge plug. Therefore, the charge control device 10 is enabled to determine whether the termination condition to terminate the alarming operation is satisfied by determining whether the charge plug is mounted on the mounting port according to the information, which is acquired at step S50.

When the charge control device 10 determines that the charge plug is mounted on the mounting port, the charge control device 10 deems that the termination condition to terminate the alarming operation is satisfied. Thus, in this case, the charge control device 10 terminates the processing of FIG. 2. That is, the charge control device 10 deems that it is not necessary to continue the alarming operation started at step S40, since the charge plug is mounted on the mounting port. Therefore, in this case, the charge control device 10 terminates the processing of FIG. 2. The charge control device 10 is enabled to terminate the alarming operation by terminating the processing of FIG. 2. In this way, the charge control device 10 terminates the output of the alarm on determination that the termination condition to terminate the alarming operation is satisfied.

When the charge control device 10 determines that the charge plug is not mounted on the mounting port, the charge control device 10 deems that the termination condition to terminate the alarming operation is not satisfied. Thus, in this case, the processing returns to step S40. That is, the charge control device 10 deems that it is necessary to continue the alarming operation, since the charge plug is not mounted on the mounting port. Therefore, in this case, the processing returns to step S40.

The present embodiment employs the configuration to determine whether to terminate the alarming operation according to the determination whether the charge plug is mounted on the mounting port. It is noted that, the present disclosure is not limited to the present embodiment. For example, the charge control device 10 may be configured to determine whether to terminate the alarming operation on receiving a termination signal, which represents to terminate the alarming operation. In this case, an operation device (not shown) may be provided to a passenger compartment and/or a vehicular key to enable an occupant to operate the operation device to send the termination signal to the charge control device 10. More specifically, the operation device may be equipped to a device in the passenger compartment, such as a touch-sensitive display (not shown) of the navigation device 60.

As described above, the charge control device 10 is configured to implement the alarming operation to an occupant who exits the vehicle. In other words, the charge control device 10 is configured to prompt an occupant, who exits the vehicle, to mount the charge plug. That is, the charge control device 10 is enabled to prompt an occupant to mount the charge plug, even when the occupant does not have an intention to charge the vehicle. In the present configuration, the charge control device 10 is enabled to restrict an occupant from forgetting mounting of the charge plug when the vehicular battery needs to be charged. In addition, the charge control device 10 is enabled to restrict an occupant from forgetting to mount the charge plug in this way. Therefore, it is possible to avoid a situation in which the vehicular battery cannot be charged due to forgetting to mount the charge plug.

In recent years, the number of plug-in hybrid vehicles and/or electric vehicles is increasing. Therefore, the number of charge facilities is also increasing accordingly. Accordingly, it is difficult to figure out all the charge facilities. That is, it may be difficult to update data representing the charge facilities in the map database, correspondingly to increase in the number of charge facilities. It is further noted that, the charge control device 10 is enabled to prompt an occupant to mount the charge plug steadily, without determination whether the vehicle is in a charge facility. Therefore, the charge control device 10 need not to figure out the charge facilities entirely.

It is further noted that, an occupant may move away from the vehicle sufficiently about one minute after the occupant exits the vehicle. For example, an occupant may park the vehicle in a parking space of a house of the occupant. In this case, the occupant may possibly go into a room of the occupant about one minute after the occupant exits the vehicle. Therefore, in a case where the alarming operation is implemented about one minute or later, after the occupant exits the vehicle, the alarm may not reach the occupant. In such a case, the vehicle may not be charged, since the alarm is not appropriately sent to the occupant.

In consideration of this, a certain configuration may be employed to implement the alarming operation to enable an occupant to notice the alarm, even when the occupant is away from the vehicle. For example, it is conceivable to cause the vehicular key to send an alarm, thereby to warn an occupant who has moved away from the vehicle. In this case, even when an occupant is at a place away from the vehicle, an alarm may be successfully sent to the occupant, who is, for example, in a room. Nevertheless, even when an alarm is successfully sent to the occupant in this way, the occupant needs to go to the vehicle in order to charge the vehicular battery. Consequently, the occupant may feel a burden.

In consideration of this, the charge control device 10 may be configured to execute the processing at step S40, without determination at step S30. In this case, on determination that the shift range is changed from the non-parking range to the parking range, the charge control device 10 deems that an occupant has the exit intention and implements the alarming operation. The present configuration enables the charge control device 10 to prompt an occupant to insert the charge plug before the occupant exits from the vehicle. In other words, the charge control device 10 is enabled to prompt an occupant to insert the charge plug at the very timing when the occupant exits from the vehicle. In the present configuration, the charge control device 10 is enabled to restrict implementation of the alarming operation after an occupant exits from the vehicle and moves away from the vehicle. That is, the charge control device 10 is enabled to restrict implementation of the alarming operation after an occupant exits from the vehicle and moves in a room of the occupant.

An embodiment of the present disclosure has been described above. It is noted that, the present disclosure is not limited to above-described embodiment and may encompass various modifications within the gist of the present disclosure. To accomplish the object, the present disclosure may employ various configurations to execute, for example, step S10, step S20, and step S40 in FIG. 2.

As follows, modifications of the present disclosure will be described. The modifications may be configured to produce effects equivalent to those in the above-described embodiment. The charge control device according to the modifications may implement processings, which are different from the processings of the charge control device 10 described in the above-described embodiment. However, the charge control device according to the modifications will be denoted by the charge control device 10 for convenience of the explanation.

First, a modification of the determination of the exit intention (exit intention determination) will be described. The modification of the exit intention determination includes modifications of step S10 and step S20. For convenience of the explanation, the modifications of the exit intention determination are denoted by step S10 and step S20.

First Modification

The charge control device 10 functions as the vehicle information acquisition unit at step S10 to acquire the opening-and-closing information in order to determine the occupant's exit intention. The charge control device 10 further functions as an exit determination unit at step S20 to determine whether the state of a driver's door, which is in the closing state, is changed to the opening state according to the opening-and-closing information, which is acquired at step S10. In this way, the charge control device 10 determines whether an occupant has the exit intention. In the present configuration, the charge control device 10 need not to acquire the shift information from the shift sensor 20. In other words, the charge control device 10 determines whether an occupant exits from the vehicle according to the state of the driver's door changed from the closing state to the opening state.

The charge control device 10 determines that an occupant has the exit intention when determining that the state of the driver's door changes from the closing state to the opening state. That is, the charge control device 10 determines that an occupant has the exit intention, when the acquired opening-and-closing information represents that the state of the driver's door has changed from the closing state to the opening state.

Alternatively, the charge control device 10 determines that an occupant does not have the exit intention when not determining that the state of the driver's door has changed from the closing state to the opening state. That is, the charge control device 10 determines that an occupant does not have the exit intention when the acquired opening-and-closing information does not represent that the state of the driver's door has changed from the closing state to the opening state.

A driver opens a driver's door, which is closed, when exiting from a vehicle. Therefore, the charge control device 10 is enabled to deem that an occupant exits when determining that the state of the driver's door has changed from the closing state to the opening state.

The charge control device 10 may employ a configuration to execute the processing at step S40, without implementing the determination at step S30. In this case, the charge control device 10 deems that an occupant has the exit intention and to implement the alarming operation on determination that the state of the driver's door has changed from the closing state to the opening state. The present configuration enables the charge control device 10 to prompt an occupant to insert the charge plug at the very timing when the occupant exits from the vehicle. Therefore, the charge control device 10 is further enabled to restrict an occupant from forgetting to insert the charge plug. The first modification may be implemented in combination with the above-described embodiment.

Second Modification

The charge control device 10 functions as the vehicle information acquisition unit at step S10 to acquire the lock information in order to determine the exit intention of an occupant. In addition, the charge control device 10 functions as the exit determination unit at step S20 to determine whether the state of the driver's door has changed from the unlocked state to the locked state, according to the lock information, which is acquired at step S10. In this way, the charge control device 10 determines whether an occupant has the exit intention. Therefore, in the present configuration, the charge control device 10 need not to acquire the shift information from the shift sensor 20. In other words, the charge control device 10 determines whether the occupant has exited from the vehicle according to determination whether the state of the driver's door has changed from the unlocked state to the locked state.

The charge control device 10 determines that an occupant has the exit intention on determination that the state of the driver's door has changed from the unlocked state to the locked state. That is, the charge control device 10 determines that an occupant has the exit intention when the acquired lock information represents that the state of the driver's door has changed from the unlocked state to the locked state.

Alternatively, the charge control device 10 determines that an occupant does not have the exit intention when not determining that the state of the driver's door has changed from the unlocked state to the locked state. That is, the charge control device 10 determines that an occupant does not have the exit intention when the acquired opening-and-closing information does not represent that the state of the driver's door has changed from the unlocked state to the locked state.

When a driver exits from a vehicle, the driver unlocks a lock mechanism of a driver's door of the vehicle, and subsequently, the driver opens and closes the driver's door. Thereafter, the driver locks the lock mechanism. Therefore, the charge control device 10 is enabled to deem that an occupant exits from the vehicle on determination that the state of the driver's door has changed from the unlocked state to the locked state.

The charge control device 10 may employ a configuration to execute the processing at step S40, without implementing the determination at step S30. In this case, the charge control device 10 deems that an occupant has the exit intention and to implement the alarming operation on determination that the state of the driver's door has changed from the unlocked state to the locked state. Therefore, the present configuration is enabled to produce an operation effect similar to that of the first modification.

The second modification may be implemented in combination with at least one of the embodiment and the first modification.

Third Modification

The charge control device 10 functions as the vehicle information acquisition unit at step S10 to acquire the smart key information to determine the exit intention of an occupant. The charge control device 10 further functions as the exit determination unit at step S20 to determine whether the mutual communications between the door control device and the vehicular key have terminated, according to the smart key information, which is acquired at step S10. In this way, the charge control device 10 determines whether an occupant has the exit intention. Therefore, in this case, the charge control device 10 need not to acquire the shift information from the shift sensor 20. In other words, the charge control device 10 determines whether an occupant has exited from the vehicle according to determination whether the mutual communications between the door control device and the vehicular key have terminated.

The charge control device 10 determines that an occupant has the exit intention on determination that the mutual communications between the door control device and the vehicular key have terminated. That is, the charge control device 10 determines that an occupant has the exit intention when the acquired smart key information represents that the mutual communications between the door control device and the vehicular key have terminated.

Alternatively, the charge control device 10 determines that an occupant does not have the exit intention when not determining that the mutual communications between the door control device and the vehicular key have terminated. That is, the charge control device 10 determines that an occupant does not have the exit intention when the acquired smart key information does not represent that the mutual communications between the door control device and the vehicular key have terminated.

Termination of the communications between the door control device and the vehicular key represents that an occupant is out of the vehicle. Therefore, the charge control device 10 is enabled to deem that an occupant has the exit intention on determination that the communications between the door control device and the vehicular key have terminated.

The charge control device 10 may be configured to execute the processing at step S40, without determination at step S30. In this case, the charge control device 10 deems that an occupant has the exit intention and implements the alarming operation on determination that the mutual communications between the door control device and the vehicular key have terminated. As described above, the wireless-communications area is set in a range, for example, about 0.7 meters to 1.0 meters. Generally, it takes several seconds for an occupant to exit from a vehicle and to move out of the wireless-communications area. In the present configuration, the charge control device 10 is enabled to implement the alarming operation in several seconds after an occupant exits the vehicle. The third modification 3 may be implemented in combination with at least one of the embodiment, the first modification, and the second modification.

As described above, the embodiment and the first to third modifications may be implemented in forms of various combinations. That is, the determination of the exit intention may be implemented according to two or more items among the shift information, the opening-and-closing information, the lock information, and the smart key information. In this way, the determination of the exit intention can be made with high accuracy according to the multiple information items.

For example, a configuration may be employed to make the determination of the exit intention according to the opening-and-closing information and the lock information. In this case, the charge control device 10 acquires the opening-and-closing information and the lock information at step S10. The charge control device 10 further determines that an occupant has the exit intention on determination that the state of the driver's door has changed from the closing state to the opening state and on determination that the state of the driver's door has changed from the unlocked state to the locked state. Alternatively, the charge control device 10 determines that an occupant does not have the exit intention when not determining that the state of the driver's door has changed from the closing state to the opening state and/or when not determining that the state of the driver's door has changed from the unlocked state to the locked state.

In this case, the charge control device 10 need not to acquire the shift information from the shift sensor 20. Thus, the charge control device 10 is enabled to determine the exit intention with high accuracy by acquiring the information from the door detection device 70. The charge control device 10 may employ a configuration to determine the exit intention according to the opening-and-closing information and the smart key information. The charge control device 10 may employ a configuration to determine the exit intention according to the lock information and the smart key information. The charge control device 10 may employ a configuration to determine the exit intention according to the opening-and-closing information, the lock information, and the smart key information. In either configuration, an equivalent operation effect may be produced.

As follows, a modification employing a configuration to determine whether the alarm output condition is satisfied will be described. The modification is produced by modifying step S30. Therefore, the modification will be denoted by step S30 for convenience of the explanation.

Fourth Modification

The charge control device 10 functions as the vehicle information acquisition unit at step S10 to acquire the charge information, in addition to the lid information, to determine whether the alarm output condition is satisfied. The charge control device 10 further functions as the condition satisfaction determination unit at step S30 to determine whether the alarm output condition is satisfied according to the lid information and the charge information acquired at step S10.

The charge control device 10 determines that the alarm output condition is satisfied when the lid information represents the closing state of the electricity supply lid and when the charge information represents that the vehicle is at a position where the vehicle can be charged. Alternatively, the charge control device 10 determines that the alarm output condition is not satisfied when the lid information represents the opening state of the electricity supply lid and/or when the charge information does not represent that the vehicle is at a position where the vehicle can be charged. The present configuration enables to implement the alarming operation selectively when the vehicle is in the place where the vehicle can be charged and when the lid is in the closing state. The present configuration enables further to restrict implementation of the alarming operation in a condition in which the alarming operation need not be implemented.

Fifth Embodiment

The charge control device 10 functions as the vehicle information acquisition unit at step S10 to acquire the residual quantity information in addition to the lid information to determine whether the alarm output condition is satisfied. The charge control device 10 further functions as the condition satisfaction determination unit at step S30 to determine whether the alarm output condition is satisfied according to the lid information and the residual quantity information acquired at step S10.

The charge control device 10 determines that the alarm output condition is satisfied when the lid information represents the closing state of the electricity supply lid and when the residual quantity, which is represented by the residual quantity information, is less than or equal to a predetermined value. Alternatively, the charge control device 10 determines that the alarm output condition is not satisfied when the lid information represents the opening state of the electricity supply lid and/or when the residual quantity is greater than the predetermined value. The present configuration enables to implement the alarming operation selectively when the residual quantity of the vehicular battery is small and when the lid is in the closing state. The present configuration enables to produce an operation effect equivalent to that of the charge control device 10 of the fourth modification. The fifth modification may be implemented in combination with at least one of the embodiment and the fourth modification.

Sixth Embodiment

The charge control device 10 functions as the vehicle information acquisition unit at step S10 to acquire the distance information, in addition to the lid information, to determine whether the alarm output condition is satisfied. The charge control device 10 further functions as the condition satisfaction determination unit at step S30 to determine whether the alarm output condition is satisfied according to the lid information and the distance information acquired at step S10.

The charge control device 10 determines that the alarm output condition is satisfied when the lid information represents the closing state of the electricity supply lid and when the traveling distance, which is represented by the distance information, is greater than or equal to a predetermined value. Alternatively, the charge control device 10 determines that the alarm output condition is not satisfied when the lid information represents the opening state of the electricity supply lid and/or when the traveling distance is less than the predetermined value. The present configuration enables to implement the alarming operation selectively when the previous traveling distance of the vehicle is greater than or equal to the predetermined value and when the lid is in the closing state. More specifically, the present configuration enables, for example, to avoid the alarming operation when an occupant gets on and/or exits from the vehicle when the occupant is, for example, in a house. In addition, the present configuration enables to produce an operation effect similar to that of the charge control device 10 according to the fourth modification. The sixth modification may be implemented in combination with at least one of the embodiment, the fourth modification, and the fifth modification.

Seventh Modification

The charge control device 10 functions as the vehicle information acquisition unit at step S10 to acquire, in addition to the lid information, the power source information to determine whether the alarm output condition is satisfied. In addition, the charge control device 10 functions as the condition satisfaction determination unit at step S30 to determine whether the alarm output condition is satisfied according to the lid information and the power source information acquired at step S10.

The charge control device 10 determines that the alarm output condition is satisfied when the lid information represents the closing state of the electricity supply lid and when the power source information represents a terminated state of the power source. Alternatively, the charge control device 10 determines that the alarm output condition is not satisfied when the lid information represents the opening state of the electricity supply lid and/or when the power source information does not represent the terminated state of the power source.

When the power source is not terminated, it may be deemed that an occupant determines that charge is not needed in subsequent driving. Therefore, the charge control device 10 according to the seventh modification is enabled to implement the alarming operation selectively when the power source of the vehicle is terminated and when the lid is in the closing state. More specifically, the charge control device 10 according to the seventh modification is enabled not to implement the alarming operation when, for example, an occupant gets on and exits from the vehicle temporarily. In addition, the charge control device 10 according to the seventh modification is enabled to produce an operation effect equivalent to that of the charge control device 10 according to the fourth modification. The seventh modification may be implemented in combination with at least one of the embodiment, the fourth modification, the fifth modification, and the sixth modification.

The state in which the ignition switch is in the terminated state may be equivalent to the state in which the power source is in the activated state. Therefore, the charge control device 10 may acquire, at step S10, the lid information and the ignition information to determine whether the alarm output condition is satisfied. The ignition information represents whether the ignition switch is in the activated state or in the de-activated state. The charge control device 10 is configured to determine whether the power source is in the terminated state also according to the ignition information.

In addition, the charge control device 10 may determine that the alarm output condition is satisfied when the lid information represents the closing state of the electricity supply lid and when the present state is not at the starting time of the vehicle. It may be determined whether the present state is at the starting time of the vehicle according to the opening-and-closing information. More specifically, the charge control device 10 deems that the present state is at the starting time of the vehicle when determining that the driver's door in the closing state has changed to the opening state according to the opening-and-closing information. The charge control device 10 further deems that the present state is not at the starting time of the vehicle when determining that the driver's door in the closing state has changed to the opening state and when further determining that the driver's door in the closing state has changed to the opening state. That is, the charge control device 10 deems that the present state is a time to exit from the vehicle. In other words, the charge control device 10 deems that the present state is the time of starting when determining that the closing state is changed to the opening state at the first time. The charge control device 10 deems that the present state is not the time of starting when determining that the closing state is changed to the opening state at the second time. Thus, the charge control device 10 is enabled not to implement the alarming operation when an occupant gets in the vehicle.

As described above, the fourth modification to the seventh modification may be arbitrarily combined and implemented. That is, the charge control device 10 may determine whether the alarm output condition is satisfied according to at least one of the charge information, the residual quantity information, the distance information, the power source information, and the opening-and-closing information, in addition to the lid information. In this way, the charge control device 10 is enabled to determine whether the alarm output condition is satisfied with high accuracy according to the multiple information items.

As described above, according the present disclosure, the charge control device is for the vehicle. The vehicle is configured to be equipped with the charge plug. The vehicle is equipped with the vehicular battery configured to be charged through the charge plug. The charge control device includes the vehicle information acquisition unit (S10) configured to acquire vehicle information, which represents the state of the vehicle. The charge control device further includes the exit determination unit (S20) configured to determine, according to the vehicle information, whether an occupant of the vehicle has the exit intention to exit from the vehicle. The charge control device further includes the alarming operation unit (S40) configured to implement the alarming operation to restrict the occupant from forgetting to mount the charge plug when the exit determination unit determines that the occupant has the exit intention.

The configuration of the present disclosure enables to implement the alarming operation to restrict the occupant, who exits from the vehicle, from forgetting to mount the charge plug. In other words, the configuration of the present disclosure enables to prompt an occupant, who exits from the vehicle, to mount the charge plug. That is, the configuration of the present disclosure enables to prompt an occupant to mount the charge plug, even when the occupant does not have an intention to charge the vehicle Therefore, the present disclosure enables to restrict an occupant from forgetting to mount the charge plug when the vehicular battery needs to be charged. In addition, the present disclosure enables to restrict an occupant from forgetting to mount the charge plug in this way. Therefore, it is avoidable to cause a situation in which the vehicular battery cannot be charged due to forgetting (oversight) of mounting of the charge plug.

The charge control device may further include the shift information acquisition unit configured to acquire the shift information, which represents the state of the shift range of the vehicle. In this case, the exit determination unit may be further configured to determine that the occupant has the exit intention on determination that the shift range is changed from the non-parking range to the parking range according to the shift information, which is acquired by the vehicle information acquisition unit.

An occupant operates the shift manipulation device, such as the shift lever (selector), to change the shift range to the parking range certainly, when exiting from the vehicle. That is, an occupant changes the shift range from the non-parking range, such as the drive range and/or the reverse range, other than the parking range to the parking range, when exiting from the vehicle. Therefore, the present disclosure enables to determine that the occupant exits from the vehicle when the shift range of the vehicle is changed to the parking range.

In other words, the present disclosure may implement the alarming operation in response to that an occupant changes the shift range to the parking range. In this way, the present disclosure enables to prompt an occupant to inert the charge plug before exiting from the vehicle. In other words, the present disclosure enables to prompt an occupant to insert the charge plug at the very timing when the occupant exits from the vehicle. Therefore, the present disclosure further enables to restrict an occupant from forgetting to insert the charge plug.

It is noted that, when the electricity supply lid is in the opening state, an occupant may be deemed to have an intention to charge the vehicular battery. Therefore, in this case, the alarming operation may not be needed. To the contrary, when the electricity supply lid is in the closing state, an occupant may be deemed not to have an intention to charge the vehicular battery. In this case, the occupant may forget that the vehicular battery needs to be charged, even though the vehicular battery needs to be charged actually. Thus, in this case, the occupant may not have an intention to charge the vehicular battery.

In consideration of this, according to the present disclosure, the charge control device may further include the lid information acquisition unit (S10) configured to acquire the lid information, which represents the state of the opening-and-closing state of the electricity supply lid of the vehicle. In this case, the charge control device may further include the condition satisfaction determination unit (S30) configured to determine whether the alarm output condition is satisfied according to the lid information, which is acquired by the lid information acquisition unit. In this case, the condition satisfaction determination unit may be configured to determine that the alarm output condition is satisfied when the lid information represents that the electricity supply lid is in the closing state. In this case, the alarming operation unit may implement the alarming operation when the exit determination unit determines that the occupant has the exit intention and when the condition satisfaction determination unit determines that the alarm output condition is satisfied.

In this way, the present disclosure enables to implement the alarming operation selectively when the occupant does not have an intention to charge the vehicle.

It should be appreciated that while the processes of the embodiments of the present disclosure have been described herein as including a specific sequence of steps, further alternative embodiments including various other sequences of these steps and/or additional steps not disclosed herein are intended to be within the steps of the present disclosure.

While the present disclosure has been described with reference to preferred embodiments thereof, it is to be understood that the disclosure is not limited to the preferred embodiments and constructions. The present disclosure is intended to cover various modification and equivalent arrangements. In addition, while the various combinations and configurations, which are preferred, other combinations and configurations, including more, less or only a single element, are also within the spirit and scope of the present disclosure.

What is claimed is:

1. A charge control device for a vehicle, the vehicle configured to be equipped with a charge plug, the vehicle equipped with a vehicular battery configured to be charged through the charge plug, the charge control device comprising:
a vehicle information acquisition unit configured to acquire vehicle information, which represents a state of the vehicle;
an exit determination unit configured to determine, according to the vehicle information, whether an occupant of the vehicle has an exit intention to exit from the vehicle; and
an alarming operation unit configured to implement an alarming operation to restrict the occupant from forgetting to mount the charge plug when the exit determination unit determines that the occupant has the exit intention, wherein
the vehicle information acquisition unit includes a lid information acquisition unit configured to acquire lid information, which represents an opening-and-closing state of an electricity supply lid of the vehicle,
the charge control device further comprising:
a condition satisfaction determination unit configured to determine whether an alarm output condition is satisfied according to the lid information, which is acquired, wherein
the condition satisfaction determination unit is configured to determine that the alarm output condition is satisfied when the lid information represents that the electricity supply lid is in a closing state,
the alarming operation unit is further configured to implement the alarming operation
when the exit determination unit determines that the occupant has the exit intention and
when the condition satisfaction determination unit determines that the alarm output condition is satisfied.

2. The charge control device according to claim 1, wherein
the vehicle information acquisition unit includes a shift information acquisition unit configured to acquire shift information, which represents a state of a shift range of the vehicle, and
the exit determination unit is further configured to determine that the occupant has the exit intention on determination that the shift range is changed from a non-parking range to a parking range according to the shift information, which is acquired.

3. The charge control device according to claim 1, wherein
the vehicle information acquisition unit includes an opening-and-closing information acquisition unit configured to acquire opening-and-closing information, which represents an opening-and-closing state of a driver's door of the vehicle, and
the exit determination unit determines that the occupant has the exit intention on determination that a state of the driver's door changes from a closing state to an opening state according to the opening-and-closing information, which is acquired.

4. The charge control device according to claim 1, wherein
the vehicle information acquisition unit includes a lock information acquisition unit configured to acquire lock information, which represents a locked-and-unlocked state of a driver's door of the vehicle, and
the exit determination unit is further configured to determine that the occupant has the exit intention on determination that a state of the driver's door changes from an unlocked state to a locked state according to the lock information, which is acquired.

5. The charge control device according to claim 1, wherein
the vehicle information acquisition unit includes a smart key information acquisition unit configured to acquire smart key information, which represents a mutual communication state between a communication device of the vehicle and a vehicular key, and
the exit determination unit is further configured to determine that the occupant has the exit intention on determination that mutual communications between the communication device and the vehicular key terminate according to the smart key information, which is acquired.

6. The charge control device according to claim 1, wherein
the vehicle information acquisition unit further includes a residual quantity information acquisition unit configured to acquire residual quantity information, which represents a residual quantity of the vehicular battery,
the condition satisfaction determination unit is further configured to determine whether the alarm output condition is satisfied further according to the residual quantity information, which is acquired, in addition to the lid information, which is acquired, and
the condition satisfaction determination unit is further configured to determine that the alarm output condition is satisfied
when the lid information represents that the electricity supply lid is in the closing state and
when the residual quantity information represents the residual quantity, which is less than or equal to a predetermined value.

7. The charge control device according to claim 1, wherein
the vehicle information acquisition unit further includes a charge information acquisition unit configured to acquire charge information, which represents whether the vehicle is at a position where the vehicle is chargeable,
the condition satisfaction determination unit is further configured to determine whether the alarm output condition is satisfied further according to the charge information, which is acquired, in addition to the lid information, which is acquired, and
the condition satisfaction determination unit is further configured to determine that the alarm output condition is satisfied
when the lid information represents that the electricity supply lid is in the closing state and
when the charge information represents that the vehicle is at the position where the vehicle is chargeable.

8. The charge control device according to claim 1, wherein
the vehicle information acquisition unit further includes a distance information acquisition unit configured to acquire distance information, which represents a traveling distance of the vehicle in a period after an ignition device of the vehicle is activated until the ignition device is de-activated subsequently,
the condition satisfaction determination unit is further configured to determine whether the alarm output condition is satisfied further according to the distance information, which is acquired, in addition to the lid information, which is acquired, and
the condition satisfaction determination unit is further configured to determine that the alarm output condition is satisfied
when the lid information represents that the electricity supply lid is in the closing state and when the traveling distance represented by the distance information is greater than or equal to a predetermined distance.

9. The charge control device according to claim 1, wherein
the vehicle information acquisition unit further includes a power source information acquisition unit configured to acquire power source information, which represents an operation state of a power source of the vehicle,
the condition satisfaction determination unit is further configured to determine whether the alarm output condition is satisfied further according to the power source information, which is acquired, in addition to the lid information, which is acquired, and
the condition satisfaction determination unit is further configured to determine that the alarm output condition is satisfied
when the lid information represents that the electricity supply lid is in the closing state and
when the power source information represents that the power source is in a terminated state.

* * * * *